(12) United States Patent
Brown et al.

(10) Patent No.: US 8,245,021 B2
(45) Date of Patent: Aug. 14, 2012

(54) SYSTEM AND METHOD FOR RE-IMAGING COMPUTERS

(75) Inventors: Norman P. Brown, Tomball, TX (US); Wayne Sharum, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1753 days.

(21) Appl. No.: 10/886,795

(22) Filed: Jul. 8, 2004

(65) Prior Publication Data

US 2006/0010315 A1    Jan. 12, 2006

(51) Int. Cl.
*G06F 15/177* (2006.01)
*G06F 11/00* (2006.01)
(52) U.S. Cl. ............................................................ 713/2
(58) Field of Classification Search ........................ 713/2
See application file for complete search history.

(56) References Cited

U.S. PATENT DOCUMENTS

| | | | |
|---|---|---|---|
| 5,826,015 A | 10/1998 | Schmidt | |
| 6,128,694 A | 10/2000 | Decker et al. | |
| 6,195,685 B1 | 2/2001 | Mukherjee et al. | |
| 6,463,530 B1 | 10/2002 | Sposato | |
| 6,601,096 B1 | 7/2003 | Lassiter, Jr. | |
| 6,643,772 B1 | 11/2003 | Aguilar et al. | |
| 6,715,067 B1 * | 3/2004 | Rhoads et al. | 713/1 |
| 6,748,525 B1 * | 6/2004 | Hubacher et al. | 713/1 |
| 6,948,099 B1 * | 9/2005 | Tallam | 714/38 |
| 7,062,643 B2 * | 6/2006 | Miyajima | 713/1 |
| 7,065,640 B2 * | 6/2006 | Paul et al. | 713/2 |
| 7,103,641 B2 * | 9/2006 | Brannock | 709/217 |

OTHER PUBLICATIONS

"Software Updates"[On Line]—3 pages Retrieved from: http://www.wyse.com/products/winterm/quickstart/1000/AdminHelp/System_Administration/Softwre_Updates.htm Retrieved on Jun. 28, 2004.
"Powerful Linux-based thin client from the market leader" [On Line]—2 pages Retrieved from: http://www.wyse.com/products/winterm/5125SE/5125.pdf Retrieved on Jun. 28, 2004.

* cited by examiner

*Primary Examiner* — Kim Huynh
*Assistant Examiner* — Eric Chang

(57) ABSTRACT

According to an embodiment, a system comprises a client, a BIOS on the client, and an image support application in the BIOS operable to re-image the client.

32 Claims, 4 Drawing Sheets

SYSTEM AND METHOD FOR RE-IMAGING COMPUTERS

BACKGROUND

Many enterprises currently employ computer systems based on the client/server architecture. In a client/server architecture, a client computer (usually a user computer, such as a PC) requests a number of resources from server applications (usually on a larger, specialized computer), such as data, applications, and some processing. Clients and servers are connected over a network, such as a Local Area Network (LAN) or a Wide Area Network (WAN), and many computer systems employ one or more applications servers and one or more database servers to communicate with many clients and to provide them with a full range of applications and data.

Some systems may utilize general-purpose PCs as "fat clients." In other words, while the client computer will receive some applications and processing from the server, most of the storage and processing will occur at the client, which may include multiple storage devices (hard drive, floppy drive, CR ROM drive, etc.) on which many programs are stored and ready to run with little or no input from the server. In such systems, the server's main function may be that of a remote hard drive, simply storing and retrieving programs and data while doing little processing for client application uses.

Some systems may utilize what are referred to as "thin clients." Thin clients can be any type of computer, but are usually stripped-down versions of a user computer with very minimal storage capacity. In a thin client arrangement, much of the processing may be accomplished by the server, as well as much of the application storage. Thus, some thin client arrangements may be considered highly centralized because most of the functionality and storage resides on the server side while the clients operate almost as dumb terminals.

Various techniques exist for operating a thin client system, including storing most of the applications and the operating system on a server computer, such that the thin clients actually boot from the server. Another technique involves storing an operating system on a thin client so that the client boots itself to some degree, depending on the number of routines that are on the client versus on the server.

In a thin client system, it may be desirable to replace the operating system on the thin client from time to time, and a traditional way to replace that operating system is to employ a module on the operating system itself that handles some of the replacement functions. However, if the operating system becomes non-functional (through, for example, a write error or corruption) the module may be inaccessible, which is a disadvantage of many traditional systems.

SUMMARY

According to at least one embodiment, a system comprises a client, a BIOS on the client, and an image support application in the BIOS operable to re-image the client. According to at least one other embodiment, a method comprises requesting an image from a network resource through use of an image support application external to the image itself and installing the image on the client through use of the image support application. According to at least one other embodiment, a system comprises first storage means for storing an image, means for downloading an image for use on a client, and means for installing the image on the client, wherein the means for downloading and means for installing are routines located on second storage means separate from the first storage means.

DETAILED DESCRIPTION

Figure 1:
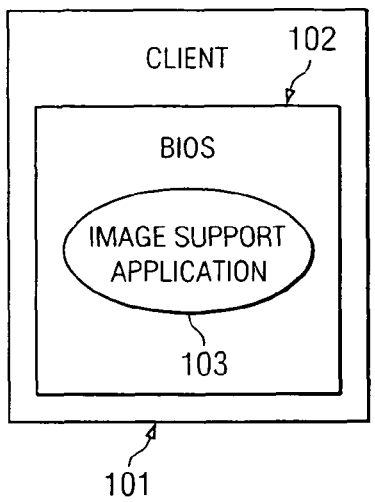
FIG. 1 is a block diagram of a system, adapted according to various embodiments, for re-imaging a client.

FIG. 1 is a block diagram of system 100, adapted according to various embodiments, for re-imaging client 101. System 100 includes client 101, Basic Input Output System (BIOS) 102, and image support application 103, and those components are arranged such that image support application 103 is included in BIOS 102, which resides on client 101. Client 101 may be any kind of client (fat, thin, etc.); however, various embodiments are particularly suited for thin client systems, as discussed more fully below. Image support application 103 is operable to re-image client 101, which means it may perform a process which directs the installing of a new image on client 101. Re-imaging may include, among other things, determining that a new image is needed, requesting the new image from a network resource, validating the new image once it is received by the client, and installing the new image on the client.

An image may be considered to be the operating system that is run on a client, and in some embodiments, the image may also include one or more programs for use on the client. In many thin client scenarios, because the amount of processing and storing that takes place on the client is minimal, the operating system and any programs will also be minimal in size.

A BIOS, such as BIOS 102, is a set of instructions (routines) residing in firmware, which when executed by a processor, operates to configure the computer at startup and to act as an interface between the hardware supported by a computer and the operating system. A typical BIOS operates by running at startup or reboot to discover hardware, to set up interrupt vectors to access the routines associated with the hardware, and to load the operating system and pass control thereto once startup is over. A BIOS is typically located on firmware, which is a type of Read Only Memory (ROM), and is, therefore, usually not able to be changed without special procedures. While this property of some BIOSs may make them inflexible and inadaptable, those BIOSs are resistant to viruses, power outages, and the like, which often work to erase or corrupt data stored on Random Access Memory (RAM).

Re-imaging, as described above, may often be used to install an image on a client for a number of reasons and in a number of different scenarios. In some systems, the image may become corrupt and need to be replaced in order to ensure proper operation of the client. In other systems, the image may be replaced to install a new version of the image or a version with new or different features. Re-imaging for any reason may be supported by various embodiments described herein.

In the embodiment in FIG. 1, image support application 103 is located in BIOS 102. Some traditional thin client systems include a module operable to re-image the client on the image itself. Traditional systems may, therefore, be subject to disadvantages, as described more fully below.

Figure 2:
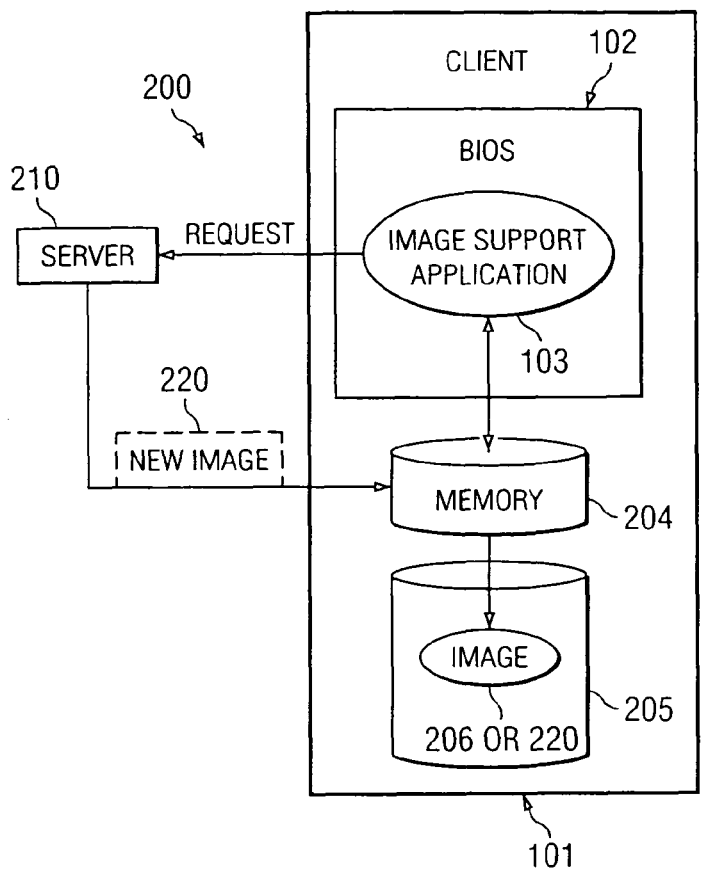
FIG. 2 is a block diagram of an example system, adapted according to various embodiments, for re-imaging a client.

FIG. 2 is a block diagram of example system 200, adapted according to various embodiments, for re-imaging client 101. In this exemplary embodiment, system 200 includes two main components—a network resource (in this case, server 210) and client 101. Client 101, which may be a thin client, includes BIOS 102, memory 204, and flash memory 205. Image support application 103 runs on BIOS 102, and is operable to re-image client 101. In this example, memory 204 is RAM; however, various types of memory may also be employed, including magnetic memory and the like. Memory 204 operates as read/write memory, allowing various applications (including image support application 103) to read data therefrom and write data thereto during operations.

Flash memory 205, in this example, may be any of various types of flash memory, such as a memory stick, a chip mounted on a printed circuit board, and the like. Flash memory 205 is used to store the current version of an image for booting and running client 101. While flash memory 205 is used in this embodiment, other forms of memory that are operable to hold content without power (i.e., other non-volatile types of memory) may be used, such as a hard disk, floppy disk, or the like. Thus, in this embodiment, flash memory 205 holds either new image 220 or old image 206, depending on whether re-imaging has been performed.

In an example embodiment, image 206 (the old image version) becomes corrupted, through viruses, write errors, or other memory-affecting phenomena. As a result, the operating system and programs on client 101 either do not operate correctly or do not operate at all. A user who has noticed that client 101 fails to operate correctly may then reboot client 101. While client 101 is rebooting, BIOS 102 begins startup, and it may display a prompt inviting the user to press a key or combination of keys to start a re-imaging process. If the user presses the proper key(s), image support application 103 is then launched by BIOS 102. In some embodiments, image support application 103 includes an interface for communicating with the user and to gather information from the user. In those embodiments, application 103 may request from the user such information as server name, path name, port, user ID and password, or the like in order to begin re-imaging. In some embodiments, any or all of that information may reside on BIOS 102 such that it is not required that a user enter the information.

Continuing with the example, image support application 103 then requests an uncorrupted image from server 210. Server 210 downloads new image 220 to client 101, and new image 220 is stored, at least temporarily, in memory 204. At this point, image support application 103 verifies or validates new image 220 by checking to make sure that the entire image 220 has been received, by, for example, performing Cyclical Redundancy Checking (CRC). In this example, if the transmission from server 220 has ended without a complete new image 220, image support application 103 may request new image 220 from server 210 once more.

If new image 220 is complete, then image support application 103 may then install new image 220 by writing it to flash memory 205, where it replaces corrupted image 206 and is ready for booting and operation of client 101. Accordingly, image support application 103 operates to re-image client 101. While in this example re-imaging is used to replace a corrupt image, re-imaging may be used for other purposes, such as to update an image to a latest version or to install an image that is consistent with other clients on a network.

As mentioned earlier, in traditional systems, re-imaging may be accomplished through use of a module on the old image 206 itself. Such traditional systems may be acceptable when images are replaced for reasons other than corruption. However, a re-imaging module may become inaccessible if it is located on the image itself and the image becomes corrupt. Re-imaging a client when the re-imaging module is inaccessible can be an inconvenience, causing a client to be out of service for an unacceptably long time before expert help arrives. Various embodiments of the system depicted in FIGS. 1 and 2 offer the advantage of being accessible even when the image does not operate properly, thereby allowing relatively quick and convenient re-imaging.

Figure 3A:
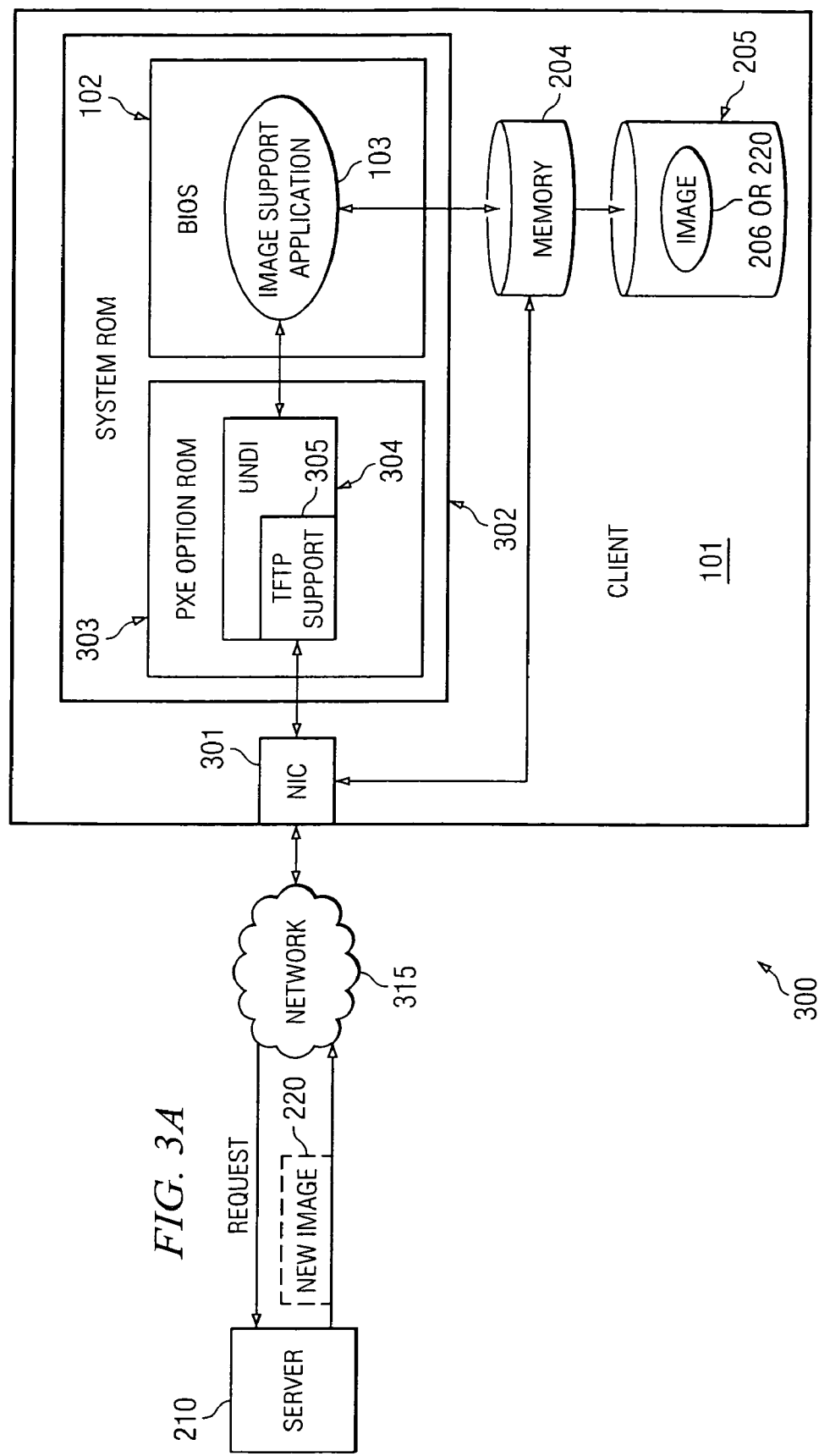
FIG. 3A is a block diagram of an example system, adapted according to various embodiments, for re-imaging a client that communicates using TFTP.

FIG. 3A is a block diagram of system 300, adapted according to various embodiments, for re-imaging client 101 that communicates using Thin (or "Trivial") File Transfer Protocol (TFTP). Similar to system 200 of FIG. 2, system 300 includes client 101, server 210, BIOS 102, and image support application 103. Client 101 includes system ROM 302, which includes BIOS 102 and Preboot Execution Environment (PXE) Option ROM (PXE OPROM) 303. In this embodiment, PXE OPROM 303 facilitates communication between client 101 and server 210 using TFTP. TFTP is a version of File Transfer Protocol (FTP) that uses Universal Datagram Protocol (UDP) over Internet Protocol (IP) to deliver a file from one computer to another computer. UDP does not support packet reordering, which means that if a stream of packets is received by client 101 with one or more packets missing, client 101 has no way to request and implement the missing packet. In other words, if a transmission is incomplete, a TFTP client may have to make a new request for the entire transferred file. UDP applications, while missing a packet reordering capability, are usually cheaper to implement, making UDP an attractive alternative for certain applications.

The TFTP capability of OPROM 303 arises from the Universal Network Driver Interface (UNDI) 304, which resides on OPROM 303 and runs TFTP support 305. UNDI 304 is a network driver software interface to a controller that allows client 101 to communicate with network 315 via Network Interface Card (NIC) 301.

An example scenario involving system 300 may begin with a user discovering that image 206 is corrupted. Accordingly, during startup, the user is prompted by BIOS 102 to press a key or combination of keys to begin a re-imaging procedure. If the user chooses to begin such a procedure, image support application 103 is launched, and, as explained earlier, may present to the user an interface for allowing that user to enter information, such as a path name of an image application, a user ID, a password, or the like. Once image support application 103 has the required information, it may proceed to re-image client 101.

Image support application 103 formulates a request for new image 220 and communicates with UNDI 305 to send that request to server 210 over network 315. UNDI 305 uses TFTP support 305 to send the request using TFTP over UDP, and it controls NIC 301 such that client 101 is able to communicate with server 210 over network 315. The request is sent to server 210, and server 210 responds by sending the requested image 220 to client 101 over network 315. New image 220 is downloaded over network 315 in a series of packets, which are received at NIC 301 and written into memory 204. Image support application 103 may communicate with UNDI 304 to direct that image 220 is written to memory 204 when it is downloaded.

Image support application 103 then verifies the transfer by checking if every packet sent was received properly. Because client 101 uses TFTP over UDP, if image 220 is determined to have been received improperly, image support application 103 must make another request for image 220. If it is determined that the image has been received properly, image support application 103 then writes image 220 into flash memory 205 over old image 206. Booting may then continue with the loading and running of the operating system in image 220 and handing control of client 101 to the operating system from BIOS 102. Thus, image support application 103 is operable to re-image client 101 through use of PXE OPROM 303 and its TFTP capabilities.

The embodiment depicted in FIG. 3A may be very advantageous in some thin client systems. For example, many thin client systems are manufactured to include PXE OPROM 303 with TFTP capabilities and a BIOS adapted to communicate with OPROM 303. Because such thin client systems include the TFTP functionality on a PXE OPROM, that functionality does not need to be placed on BIOS 102. Thus, modification of such a system to include the operability of system 300 would involve installing logic to direct instructions (such as instructions to write image 220 to memory 204 during download) and requests for new images from image support application 103 to PXE OPROM 303.

In this example, the logic may include functionality to call UNDI 304 to initialize NIC 301, to prompt the user for the TFTP server name and filename, to call into TFTP support 305 to transfer image 220 into memory 204, to perform CRC or checksum for verification, and to write image 220 into flash memory 205. Such logic may be referred to as "glue logic" that stitches together image support application 103 and PXE OPROM 303. In some embodiments, the glue logic may be quite minimal in size, and, therefore, the size of BIOS 102 would not need to be increased substantially in order to accommodate such functionality.

While the TFTP implementation in system 300 may provide ease of adaptation without substantially increasing the size of BIOS 102, disadvantages also exist. For instance, a disadvantage of using TFTP for re-imaging may be that many firewalls will not allow TFTP communications to pass through, thereby restricting such communications to small network areas.

Figure 3B:
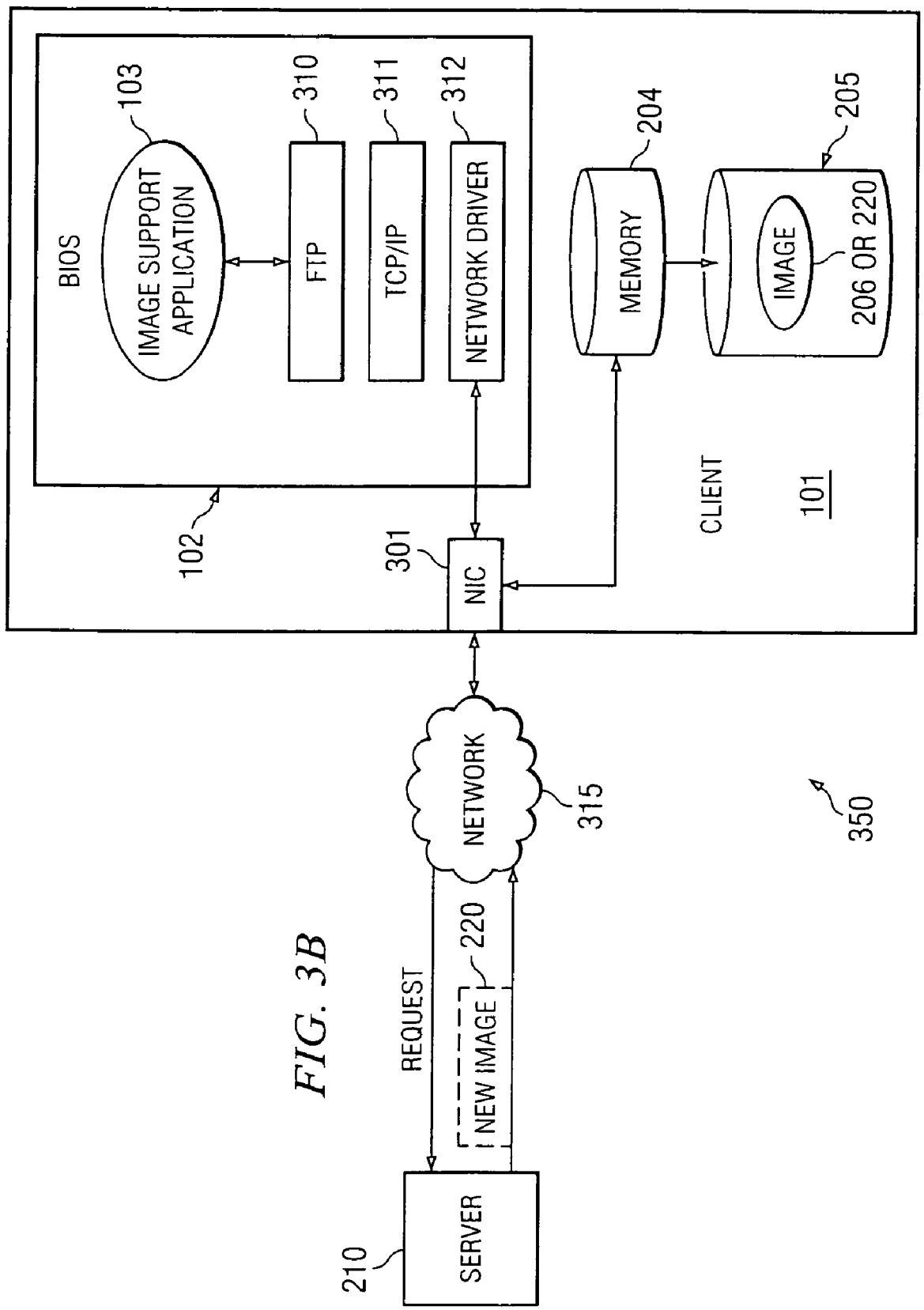
FIG. 3B is a block diagram of an example system, adapted according to various embodiments, for re-imaging a client that communicates using FTP.

FIG. 3B is a block diagram of system 350, adapted according to various embodiments, for re-imaging client 101 which communicates using FTP. System 350 differs from system 300 in several ways, most notably that FTP communication capability is supported on BIOS 102. In this example, FTP 310 runs on top of Transmission Control Protocol (TCP) over IP 311, which runs on top of network driver 312. Network driver 312 controls NIC 301, thereby allowing client 101 to communicate with server 210 over network 315.

An example scenario illustrates how image support application 103 operates to re-image client 101 in this example embodiment. Similar to the previous example scenarios, BIOS 102 allows a user at startup to choose to initiate image support application 103. Application 103 is then launched, and it formulates a request to send to server 210 to ask for new image 220. In this case, application 103 sends the request to network driver 312, which uses its FTP and TCP/IP capabilities to send the request to server 210 over network 315. Server 210 then replies to the request by providing new image 220, which it sends over network 315 as packets using FTP and TCP. New image 220 is downloaded to client 101 through NIC 301, and is written in memory 204. Because client 101 is communicating using FTP and TCP, packet reordering is supported such that any packets that are not received correctly will be sent again and written to memory 204, thereby writing a complete representation of image 220 in memory 204. This embodiment may or may not employ a verifying step because the possibility that an incomplete representation of image 220 has been received is minimized through use of FTP and TCP. Some embodiments may employ a verifying step to double check the completeness of image 220 or even to check another attribute of image 220, such as whether it is the latest version of the image or if it includes one or more desired programs.

If it is determined that the image is somehow unacceptable by the verifying step, image support application 103 may make another request to server 210. If there is no verification step or if there is a verification step that approves image 220, image support application 103 may then write image 220 to flash memory 205 over old image 206. BIOS 102 is then ready to proceed with booting, including loading and running the operating system in image 220 and passing control thereto. In this way, image support application 103 operates to re-image client 101.

An advantage of system 350 is that it communicates with FTP over TCP/IP, which allows for packet reordering, as explained above. Such an embodiment may provide for more predictable downloading of images, and may eliminate the need to request the same image twice because the image may be expected to be downloaded properly on the first attempt. Another advantage of some FTP embodiments over TFTP embodiments is that FTP communications may, in many cases, pass through firewalls, allowing client 101 to communicate with applications and computers outside of its immediate network area. In those embodiments, client 101 may be able to directly request a new image from a vendor of such images. A disadvantage of some FTP embodiments is that often the FTP functionality has to be built into BIOS 102. That functionality may include network driver 312, and the TCP/IP stack up to FTP (310 and 311) and may take up enough space to require an increase in the size of BIOS 102 when compared to other thin client designs.

Figure 4:
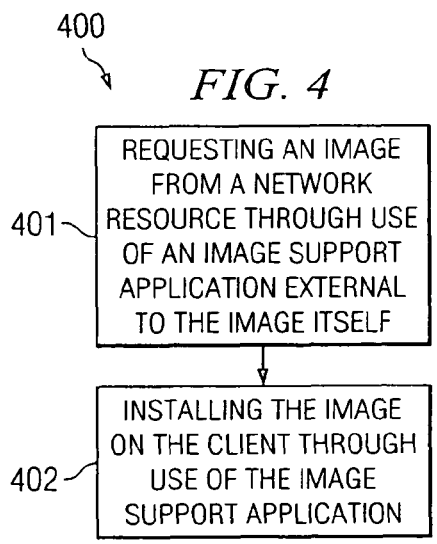
FIG. 4 is a simplified block diagram illustrating an exemplary method for re-imaging a client.

FIG. 4 is a simplified block diagram illustrating exemplary method 400 for re-imaging a client. In operational block 401, an image is requested from a network resource through use of an image support application external to the image itself. In some embodiments, the image support application may be located in the BIOS of the client. In an example alternative embodiment, the image support application is located on a server, and the BIOS of the client includes routines operable to trigger the execution of the application on the server. Other alternative embodiments exist wherein the image support application is located external to the image itself, and all are within the scope of various embodiments.

The request may be in response to any of a variety of stimuli, such as a function to re-image periodically, a command from a user to re-image, or the like. In fact, exemplary method 400 may be part of an application that automatically checks for and installs updates or replaces corrupted images. The network resource may be a server or other processing apparatus, and the network may be any of a variety of network types, including a WAN, a LAN, a wireless network, the Internet, etc.

In operational block 402, the image is installed on the client through use of the image support application. The memory device on which the image is installed may be any of a variety of memory devices that keep data, even in the absence of power, such as a flash memory device, a hard or floppy disk, an optical disk, etc. An alternate embodiment may install the image on RAM; however, such an embodiment would require re-imaging each time power is disconnected from the client. Further, the image support application may be one program or may be a collection of several different programs that operate to re-image the client. Any number of programs that make up the image support program are within the scope of the various embodiments.

Figure 5:
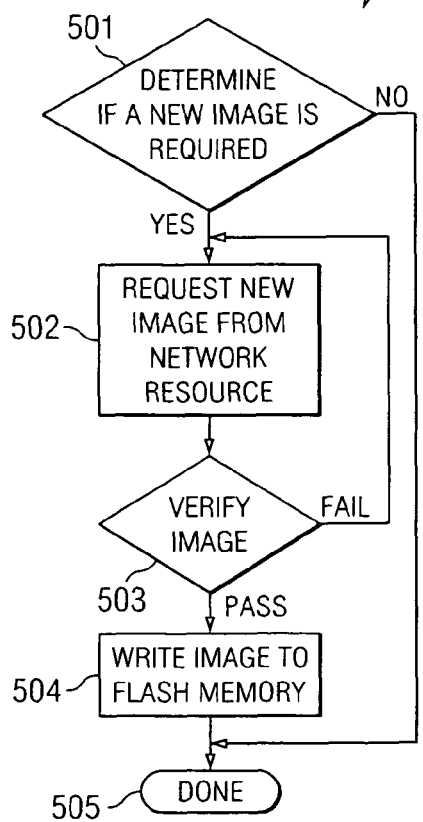
FIG. 5 is a flowchart illustrating a method which may be performed by an image support application for re-imaging a client.

FIG. 5 is a flowchart illustrating method 500 which may be performed by an image support application for re-imaging a client. In block 501, the imaging support application determines if a new image is required. The determining may be a result of receiving a command from a user, in response to a routine that periodically requests re-imaging, in response to a routine that determines whether an image is corrupt, etc. The determining may also include checking, such as prompting a user to verify that re-imaging is desired if a re-imaging command is received, checking a time since the current image was installed, checking to see if a new image is available, or the like. If it is determined that a new image is not required, no further re-imaging steps are performed in this embodiment, and the process is done 505. If it is determined that a new image is required, a new image is requested from a network resource 502. The network resource may be a server, a peer, or other device in communication with a network.

After the client has downloaded the new image from the network resource, the image is verified 503 to determine if it is appropriate to install on the client. If, for example, the received representation of the new image is incomplete, the image may fail the verification stage 503. In this example, when the image fails verification 503, a new request to the network is made 502. This verification 503 and re-requesting 502 may continue until a complete representation of the image is received by the client. Some embodiments may employ a mechanism that limits the number of verification/re-request steps that may be performed in order to prevent an infinite loop from occurring. Still other embodiments may employ a mechanism that requests an image from an alternate network resource once verification/re-request has been performed a number of times. All are within the scope of embodiments of the present invention.

If the image passes verification, the image is written to flash memory. Alternate embodiments may employ other types of memory, as explained above with regard to block 402 of FIG. 4, and utilizing those types of memory are within the scope of the various embodiments. Once the image is installed, in this example, the process is done 505. In many embodiments, method 500 is part of a startup process for a client, and after step 504 is performed, other parts of the BIOS will continue to boot the client, including loading and running the operating system and programs that make up the image.

When implemented via computer-executable instructions, various elements of embodiments of the present invention are in essence the code defining the operations of such various elements. The executable code or instructions that make up the image support application may be programmed into the BIOS when the BIOS is initially written in ROM, or it may be written later using a ROM updating application or similar utility. The executable instructions or code that make up the image may be obtained by the network resource from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 6:
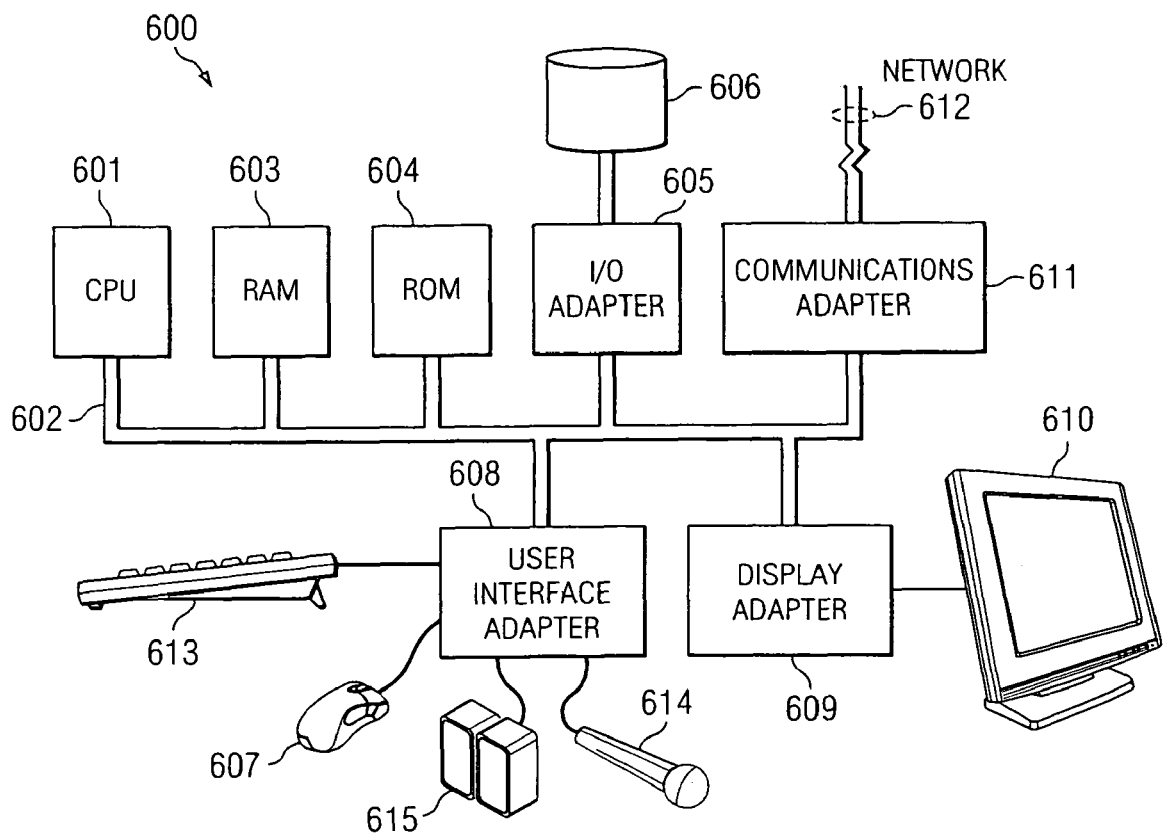
FIG. 6 illustrates an example computer system adapted according to various embodiments provided herein.

FIG. 6 illustrates an example computer system 600 adapted according to various embodiments provided herein. That is, computer system 600 is an example system on which aspects of various embodiments may be implemented (such as client computer 101 of the example implementation of FIGS. 1-3B and server computer 210 of the example implementation of FIGS. 2-3B). Central processing unit (CPU) 601 is coupled to system bus 602. CPU 601 may be any general purpose CPU, and the present invention is not restricted by the architecture of CPU 601 as long as CPU 601 supports the inventive operations as described herein. CPU 601 may execute the various logical instructions according to embodiments of the present invention. For example, CPU 601 may execute machine-level instructions according to the exemplary operational flows described above in conjunction with FIGS. 4 and 5.

Computer system 600 may also include random access memory (RAM) 603, which may be SRAM, DRAM, SDRAM, or the like. Computer system 600 may include read-only memory (ROM) 604 which may be PROM, EPROM, EEPROM, or the like. RAM 603 may be used to hold a representation of image 220 (as in FIGS. 2-3B). ROM 604 may accommodate BIOS 102, as explained above with regard to FIG. 3A.

Computer system 600 may also include input/output (I/O) adapter 605, communications adapter 611, user interface adapter 608, and display adapter 609. I/O adapter 605, user interface adapter 608, and/or communications adapter 611 may, in certain embodiments, enable a user to interact with computer system 600 in order to input information, such as a command to re-image client 101

I/O adapter 605 may connect to storage device(s) 606, such as one or more of a flash memory, hard drive, compact disc (CD) drive, floppy disk drive, tape drive, etc. to computer system 600. In the case of client 101 (of FIGS. 1-3B), flash memory may be used to store image 220 after installation. Communications adapter 611 (which may include the functionality of NIC 301 of FIGS. 3A and 3B) is adapted to couple computer system 600 to network 612 (similar to network 315 of FIGS. 3A and 3B). User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display a user interface at client 101 (FIGS. 1-3B) for a user to input instructions to image support application 103 (FIGS. 1-3B) in some embodiments.

It shall be appreciated that various embodiments not limited to the architecture of system 600. For example, many suitable processor-based devices may be utilized for either client 101 or server 210 (FIGS. 1-3B). Moreover, various embodiments may be implemented on application specific integrated circuits (ASICs) or very large scale integrated (VLSI) circuits. In fact, persons of ordinary skill in the art may utilize any number of suitable structures capable of executing logical operations according to embodiments described herein.

What is claimed is:
1. A system comprising:
a client;
a BIOS on the client to receive a request for an update image for the system in response to a routine that determines whether an old image is corrupt; and
an image support application in the BIOS operable to re-image the client by initiating an image from a network source and installing the image on the client, wherein the image support application is invoked directly from the BIOS.

2. The system of claim 1 wherein the image support application includes a user interface for receiving user commands to re-image the client.

3. The system of claim 1 further comprising a Preboot Execution Environment (PXE) Option ROM (PXE OPROM).

4. The system of claim 3 wherein the image support application utilizes a TFTP-enabled support program on the PXE OPROM to communicate with a network.

5. The system of claim 1 further comprising a network driver and an FTP and TCP/IP stack on the BIOS.

6. The system of claim 5 wherein the image support program utilizes the network driver and the FTP and TCP/IP stack to communicate with a network.

7. The system of claim 1, wherein the BIOS is located on Read Only Memory (ROM) on the client, and the client further comprises Random Access Memory (RAM) and flash memory.

8. The system of claim 1, wherein the client is operable to download an image from a server on a network.

9. The system of claim 8 wherein the image is an operating system and one or more programs for use on the client.

10. The system of claim 1 wherein the image support application is operable to re-image the client without requiring the client to first boot-up an operating system.

11. A method comprising:
receiving, in a BIOS, a request for an update image for a client in response to a routine that determines whether an old image is corrupt;
in response to the request, invoking, in the BIOS, an image support application;
initiating, from the image support application, an image from a network resource; and
installing the image on the client through use of the image support application, wherein the image support application is invoked directly from the BIOS.

12. The method of claim 11 wherein installing the image comprises: downloading the image to memory; verifying the image; and writing the image to flash memory.

13. The method of claim 12 wherein verifying the image comprises checking whether the image is complete.

14. The method of claim 11 further comprising: displaying an interface to a user; and receiving input from the user through the interface.

15. The method of claim 14 wherein the input is a command from the user to re-image the client.

16. The method of claim 11 wherein the requesting and installing are performed periodically.

17. The method of claim 11 wherein the requesting and installing are performed in response to notification that the image is a new version.

18. The method of claim 11 wherein requesting comprises communicating with the network resource through TFTP over UDP.

19. The method of claim 11 wherein requesting comprises communicating with the network resource through FTP over TCP/IP.

20. The method of claim 11 further comprising determining that the image is required.

21. The method of claim 11 further comprising loading and running the image on the client.

22. The method of claim 11 wherein the image support application is in a BIOS on the client.

23. A system comprising:
a memory module having capacity to store an image;
a BIOS stored on the memory module to receive a request for an update image for the system in response to a routine that determines whether an old image is corrupt;
an image support application in the BIOS for downloading an image for use on a client and installing the image on the client, wherein the image support application is invoked directly from the BIOS.

24. The system of claim 23 further comprising means for verifying that the downloaded image is appropriate for installation on the client.

25. The system of claim 23 wherein the image support application include means for communicating with a server on a network through FTP.

26. The system of claim 23 further comprising a PXE OPROM with a TFTP support module.

27. The system of claim 23 wherein the client is a thin client.

28. The system of claim 23 further comprising means for receiving a command from a user to re-image the client.

29. The system of claim 23 wherein the image support application automatically checks for and installs updates.

30. The system of claim 23 wherein the image comprises: an operating system; and one or more applications for use on the client.

31. The system of claim 23 further comprising a system ROM on the client.

32. The system of claim 31 wherein the system ROM comprises a BIOS.

* * * * *